Figure 1:
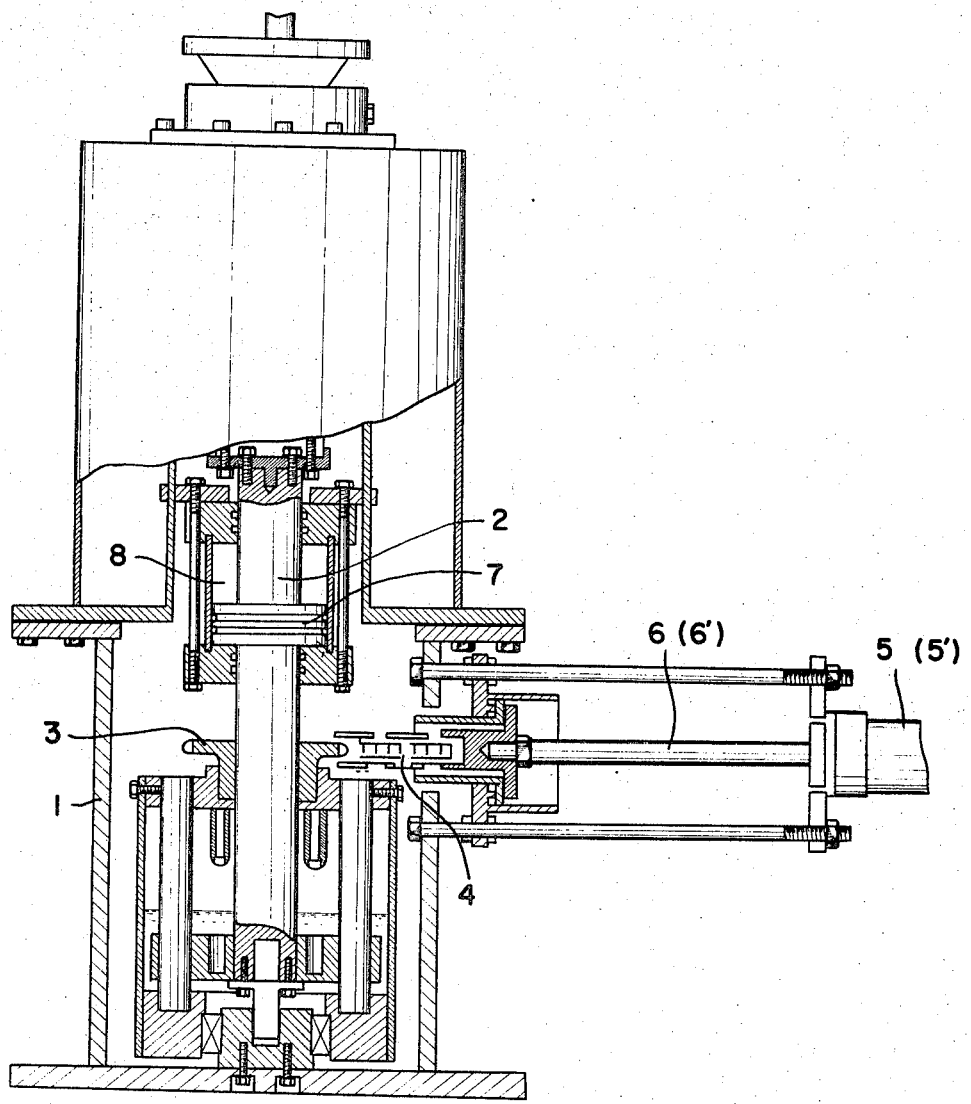

United States Patent [19]

Fujiwara et al.

[11] 3,729,073
[45] Apr. 24, 1973

[54] BUFFER DEVICE OF A ROBOT MACHINE FOR CONTROLLING THE ROTATIONAL MOVEMENT OF A ROBOT ARM

[75] Inventors: Hisao Fujiwara; Kentaro Sakamoto; Goro Wada, all of Totsuka-ku, Kanagawa-ken, Yokohama, Japan

[73] Assignee: Kabushiki Kaisha Keiaisha Seisakusho, Kanagawa-ken, Japan

[22] Filed: June 14, 1971

[21] Appl. No.: 152,574

[30]     Foreign Application Priority Data

June 30, 1970  Japan .................................45/56452

[52] U.S. Cl. ..........................188/303, 92/10, 92/137, 188/286
[51] Int. Cl. ................................................F16f 9/26
[58] Field of Search .....................188/302, 303, 304, 188/284, 286; 92/8, 10, 137

[56]     References Cited

UNITED STATES PATENTS 2,013,904   9/1935   Whitted ...............................188/304

2,098,501   11/1937   Lasier ................................188/303 X
3,464,317   9/1969   Woodward ..........................92/137 X

FOREIGN PATENTS OR APPLICATIONS 395,065   7/1933   Great Britain .......................188/303
786,780   11/1957   Great Britain .......................188/286

Primary Examiner—George E. A. Halvosa
Attorney—Larson, Taylor & Hinds

[57]     ABSTRACT

This invention relates to a buffer device of a robot machine for controlling rotational movement of a robot arm by smoothly and accurately operating the rotational shaft at both ends of its swing motion, and which comprises a rotational shaft, a chain for driving said shaft, pistons in the hydraulic pressure means, the ends of said chain being applied between said pistons, stop members provided at ends of piston rods in engagement with pistons slidable in the cylinders, whereby airtight chambers are formed in said cylinders connected with a pipe and said airtight chambers are opened or closed by means of valves operable by said pistons.

5 Claims, 2 Drawing Figures

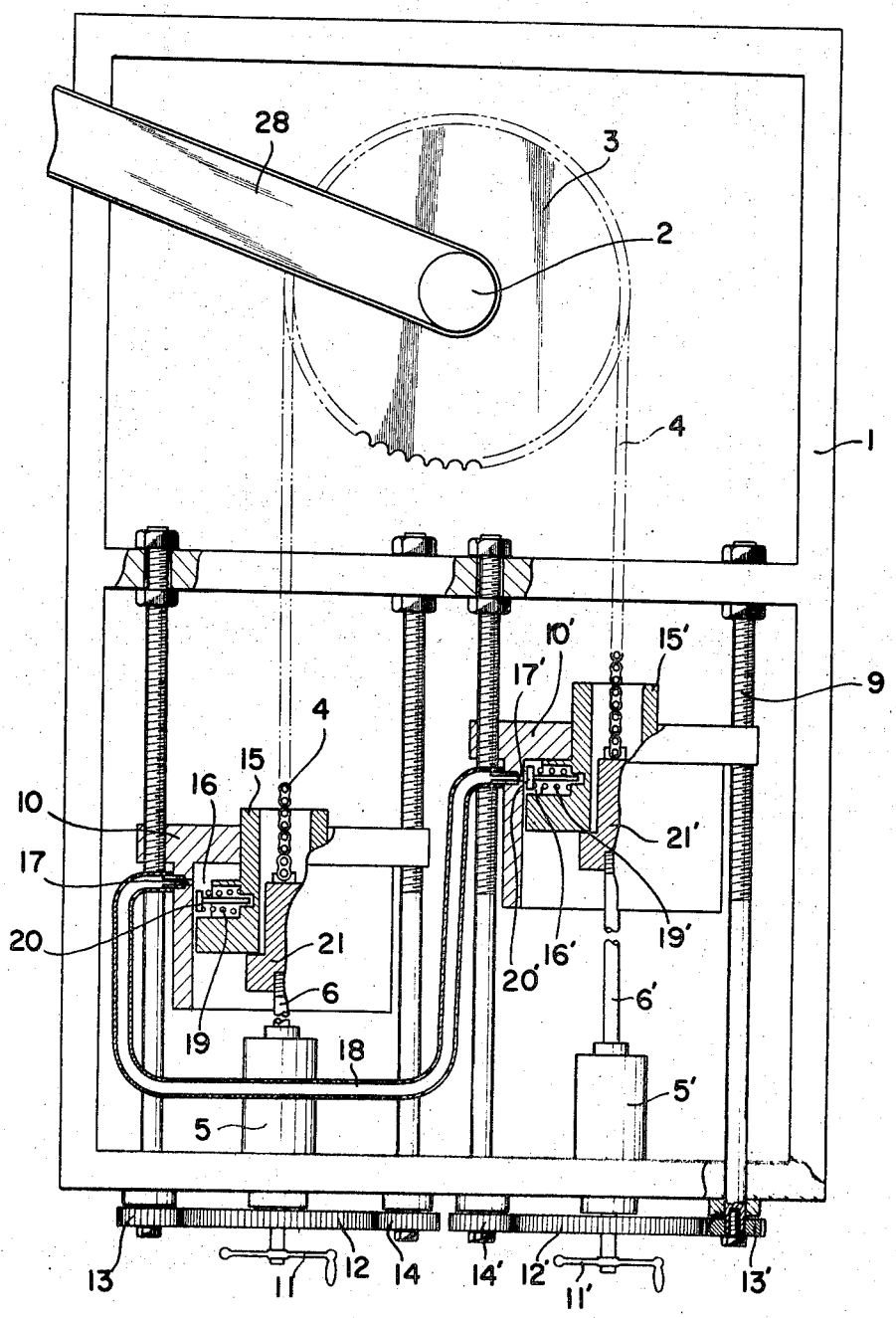

BUFFER DEVICE OF A ROBOT MACHINE FOR CONTROLLING THE ROTATIONAL MOVEMENT OF A ROBOT ARM

This invention relates to a robot machine for industries and, more particularly to a buffer device for a robot machine for controlling rotational movement of a robot arm.

Known industrial robots have been generally employed for the transfer of a manufactured article or work piece from one place to the other during operation such as in the press mill and other places.

The industrial robot of the kind as above described usually comprises a holder means fixed at an end of an arm swingable on a pivot of a rotational shaft, the swing movement of the arm, upward and downward movement of the shaft, and opening or closing operation of the holder means being attained by means of hydraulic pressure device or electric motor, whereby the operation of the robot can be repeated in the order and amount of motion according to the program as predetermined.

In the beginning or at the end of a certain movement, however, the robot machine often exhibits awkwardness with respect to the operation of the holder arm due to inertia and by weight of an article which the arm withholds and carries. In particular, the drawback is recognized when the arm of the robot is not capable of stopping at a correct position as desired.

The present invention is intended to remove the above described drawback and has for its object to provide a suitable buffer means for smoothly and accurately operating the rotational shaft at both ends of its swing motion.

In accordance with the invention, two piston rods of hydraulic pressure cylinder are respectively connected to ends of a chain winding around a chain wheel secured on a main shaft in order to rotate said shaft, the free ends of said rods pass through the two pistons which pistons sliding in two cylinders secured on the machine frame in a manner that the position of said cylinders relative to said frame are changeable and forming the ring-form airtight chambers between said pistons and inner walls of said cylinders respectively, and said rods are engaged with the ends of pistons, and said airtight chambers are connected air-tightly, each connecting opening is provided with sliding valve which is mounted on the each piston.

As the present invention is constituted as abovementioned, when one of said hydraulic pressure means are operated and the chain is pulled to said hydraulic pressure means, the other piston rod moves the piston in the cylinder in the direction to the end of said cylinder compressing the gas in said chamber, so that said gas is transferred into the other chamber and then expands volume of said chamber. In one view, upon reaching the termination of pulling operation, the slide valve secured on the piston closes said connecting opening, and after this moment, said airtight chambers is intercepted from the other chamber, so that gas in said chamber is compressed and acts with buffer effect. Accordingly, effective buffering can be obtained.

The invention will now be illustrated by way of example on an embodiment with reference to the drawings, in which:

FIG. 1 is a cross section of an essential portion of an industrial robot machine provided with a buffer device according to the invention; and FIG. 2 is a view illustrating the buffer device.

Referring now to the drawings, a machine frame 1 is shown having a main shaft 2 which is rotatable and slidable upwardly and downwardly. The rotation of the main shaft 2 is effected by the chain wheel 3 capable of moving by means of a key so that the main shaft can slide upwardly and downwardly through the boss of said chain wheel but cannot relatively rotate in it. The both ends of the chain 4 winding about the chain wheel 3 are secured to rods 6 and 6' of the pistons movable in the hydraulic pressure means 5 and 5'. When the chain is pulled around by one of the hydraulic pressure means, the main shaft rotates without regard to its position either in the upward or downward direction.

The main shaft 2 thus can move upwardly or downwardly without relation to the position of rotation, provided that the hydraulic pressure is applied to either of the chambers of the cylinder 8 surrounding the piston part 7 which is integral with the main shaft 2.

Though not shown, the robot arm 28 is provided transversely at the top end of the main shaft. The robot arm has a holding means provided at the forward end thereof. The operation device for the holding means is provided inside the robot arm.

Now, referring to FIG. 2, the buffer device in association with the rotation of the main shaft 2 is shown in a plan view. The machine frame 1 is provided with four screw rods 9 and two outer cylinders 10, 10'. These cylinders 10, 10' can rotate through the transmission of gears 12, 13, 14 or 12', 13', 14' and mounted adequately in positions by handles 11, 11'. Inner piston members 15, 15' are fitted slidably respectively into the cylinders 10, 10' thereby forming ring-shaped airtight chambers 16, 16'. The airtight chambers have openings 17, 17' which are airtightly connected with a flexible pipe 18. In the cylinders, there are provided valves 20, 20' supported by means of springs 19, 19' on the pistons 15, 15'. Thus, when the piston moves closely to the cylinder end, the openings 17, 17' are closed by the valves 20, 20' (right on FIG. 2). When the piston moves apart from the cylinder end, the openings 17, 17' are opened by the valves 20, 20' (left on FIG. 2). Air in the ring-shaped chambers 16, 16' and flexible fluid line 18 is shielded from the outside and can retain air quantity as predetermined.

The chain 4 is secured respectively at ends to stop members 21, 21'. The piston rods 6, 6' of cylinders 5, 5' are respectively secured to other ends of the above stop members. The chain 4 and the stop members 21, 21' pass through the central bores of the pistons 15, 15'. The flanges of the stop members engage with the peripheral edges of the central bores of the pistons 15, 15', whereby the stop members are stopped through engagement with the pistons.

In operation, the cylinders 10, 10' may be fixed in position by the handle 11, 11', so that the chain 4 can fully be extended and placed in position. In consequence, the airtight chambers 16, 16' are communicated to each other. A hydraulic pressure will then be applied so as to pull off the piston from either one of the hydraulic pressure means 5. Therefore, the stop member 21 tends to disengage from the piston 15 and the air of the airtight chamber 16' is conducted into the airtight chamber 16. On the other hand, the stop member 21' compresses the piston 15' reducing the space of the airtight chamber 16'. With decrease of space in the chamber 16', the inside air is delivered into the inflated airtight chamber 16. By a stroke, the valve 20' will close the opening 17', whereby compression will start and buffer operation is effected at the end of the pulling operation of the chain 4.

The above described mechanism is applicable to any device which can fully comply with the object of the invention as hereinabove described.

It is most advantageous for use in the rotary movement particularly of the industrial robot machine, in which precise stopping of rotation for the arm member of the robot can be achieved without failure.

What we claim is:

1. A buffer device for use with an industrial robot machine comprising:
    a rotational shaft,
    a chain means drivingly engaged with said shaft for turning the shaft in either direction,
    a pair of hydraulic piston and cylinder units, one operably connected to each end of the chain means, said piston and cylinder units being operable for moving the chain means in either direction,
    a pair of stop members fixed on the chain means, one fixed between the shaft and one piston and cylinder unit, and the other fixed on the chain means between the shaft and the other piston and cylinder unit,
    a variable size chamber hydraulic cylinder adjacent each said stop member and positioned to be closed to a minimum size by movement of the chain means in one direction, a rigid stop being provided to prevent movement of the chain means when the hydraulic cylinder chamber reaches the said minimum size, the hydraulic cylinder and stop means being so positioned that upon movement of the chain means in one direction, one hydraulic cylinder chamber is reduced to its minimum size by the action of its respective stop member thereon, and upon movement of the chain means in the other direction, the other hydraulic cylinder chamber is reduced to its minimum size by the action of its respective stop members,
    a fluid line interconnecting said hydraulic cylinder chambers, a fixed volume of fluid being present overall in the two hydraulic cylinders and the connecting fluid line, said fluid line open into the two chambers at points which are exposed to the chambers at least when the chambers are larger than their minimum size,
    and a valve means in each hydraulic cylinder for completely closing the fluid line to prevent fluid from entering the respective hydraulic cylinder chamber from the fluid line when its respective hydraulic cylinder chamber reaches its said minimum size,
    whereby at the end of movement of the chain means in either direction, engagement of a stop member with a hydraulic cylinder, the chamber of which is at minimum size, prevents further movement of the chain means in that direction, and the hydraulic fluid prevented from returning to the relevant chamber because of the valve means closing the fluid line prevents rebounding movement of the chain means.

2. A device according to claim 1, said shaft including means for moving it along its axis, and means connecting the chain means to the shaft for turning the same regardless of the axial position of the shaft relative to the chain means.

3. A device according to claim 1, said stop members including flanged portions, said hydraulic cylinders including an outer cylindrical member fixed in place during operation, and an inner piston member, an axial opening through the inner piston member, said endless chain passing through this opening and the stop member engaging one end thereof, said chamber being an annular chamber formed between the outer cylinder and the inner piston members.

4. A device according to claim 3, said rigid stops constituted by axial engagement of the inner piston member with the outer cylindrical member.

5. A device according to claim 4, including means for adjusting the axial position of the outer cylindrical members.

* * * * *